(12) United States Patent
So

(10) Patent No.: US 11,734,974 B2
(45) Date of Patent: Aug. 22, 2023

(54) SAFE WITH BIOMETRIC LOCK MECHANISM

(71) Applicant: Hornady Manufacturing Company, Grand Island, NE (US)

(72) Inventor: Nick Wing On So, Ningbo (CN)

(73) Assignee: Hornady Mannfacturing Company, Grand Island, NE (US)

( * ) Notice: Subject to any disclaimer, the term of this patent is extended or adjusted under 35 U.S.C. 154(b) by 75 days.

(21) Appl. No.: 17/236,119

(22) Filed: Apr. 21, 2021

(65) Prior Publication Data

US 2022/0343706 A1    Oct. 27, 2022

(51) Int. Cl.
| | |
|---|---|
| *G07C 9/00* | (2020.01) |
| *G06V 40/13* | (2022.01) |
| *E05B 47/00* | (2006.01) |
| *E05G 1/04* | (2006.01) |
| *F41C 33/06* | (2006.01) |
| *E05B 65/00* | (2006.01) |
| *E05G 1/00* | (2006.01) |

(52) U.S. Cl.
CPC ...... *G07C 9/00563* (2013.01); *E05B 47/0012* (2013.01); *E05B 65/0075* (2013.01); *E05G 1/005* (2013.01); *E05G 1/04* (2013.01); *F41C 33/06* (2013.01); *G06V 40/13* (2022.01); *E05B 2047/0073* (2013.01)

(58) Field of Classification Search
CPC ............. G07C 9/00563; E05B 47/0012; E05B 65/0075; E05B 2047/0073; E05G 1/005; E05G 1/04; F41C 33/06

See application file for complete search history.

(56) References Cited

U.S. PATENT DOCUMENTS

| | | | |
|---|---|---|---|
| 1,240,981 | A | 9/1917 | Kohl |
| 3,095,724 | A | 7/1963 | Truhon |
| 3,354,570 | A | 11/1967 | Rizzo, Jr. |
| 3,589,062 | A | 6/1971 | Desmond et al. |
| 4,342,207 | A | 8/1982 | Holmes et al. |
| 4,470,277 | A | 9/1984 | Uyeda |
| 4,917,022 | A | 4/1990 | Ogasawara et al. |
| 4,964,286 | A | 10/1990 | Poyer |
| 5,010,751 | A | 4/1991 | Schwartz et al. |

(Continued)

FOREIGN PATENT DOCUMENTS

| | | |
|---|---|---|
| CN | 106960194 A | 7/2017 |
| CN | 108038480 A | 5/2018 |

(Continued)

OTHER PUBLICATIONS

Anonymous, "Gun storage evovled", Internet article, http://www.web. archive.org/web2013915055641/http://www.thegunbox.com, (retrieved Nov. 13, 2014).

(Continued)

*Primary Examiner* — Brian E Miller
(74) *Attorney, Agent, or Firm* — McHale & Slavin, P.A.

(57) ABSTRACT

A safe for the storage of a valuable, such as a firearm. The safe has an imaging system that is used to scan a portion of a human in the near infrared spectrum to image blood vessels and determine if the image matches a stored image and thereafter effect unlocking of the safe. A manual override lock system is provided to manually effect unlocking of the safe.

14 Claims, 9 Drawing Sheets

(56) References Cited

U.S. PATENT DOCUMENTS

| | | | |
|---|---|---|---|
| 5,056,342 A | 10/1991 | Prinz | |
| 5,060,583 A | 10/1991 | Stinson | |
| 5,111,199 A | 5/1992 | Tomoda et al. | |
| 5,170,919 A | 12/1992 | DeSantis et al. | |
| 5,236,086 A | 8/1993 | MacTaggart | |
| 5,280,755 A | 1/1994 | Batur | |
| 5,294,031 A | 3/1994 | Volpei et al. | |
| 5,374,919 A | 12/1994 | Zelka et al. | |
| 5,495,967 A | 3/1996 | Parton | |
| 5,579,909 A | 12/1996 | Deal | |
| 5,584,424 A | 12/1996 | Stava | |
| 5,632,166 A | 5/1997 | Wiersma | |
| 5,662,219 A | 9/1997 | Tschudy et al. | |
| 5,671,830 A | 9/1997 | Wood | |
| 5,687,896 A | 11/1997 | Clift | |
| 5,701,770 A * | 12/1997 | Cook | F41C 33/06 382/124 |
| 5,881,584 A | 3/1999 | Brunoski et al. | |
| 5,924,565 A | 7/1999 | Colee | |
| 5,943,888 A | 8/1999 | Lawson | |
| 5,967,393 A | 10/1999 | Clarke, III | |
| 6,209,250 B1 | 4/2001 | Mills | |
| 6,279,359 B1 | 8/2001 | Boisvert | |
| 6,293,207 B1 | 9/2001 | Do | |
| 6,318,134 B1 | 11/2001 | Mossberg et al. | |
| 6,405,861 B1 | 6/2002 | Siler et al. | |
| 6,570,501 B2 | 5/2003 | Bushnell et al. | |
| 6,606,492 B1 | 8/2003 | Losey | |
| 6,843,081 B1 | 1/2005 | Painter | |
| 6,876,756 B1 | 4/2005 | Vieweg | |
| 7,143,913 B2 | 12/2006 | Lindsey et al. | |
| 7,296,448 B1 | 11/2007 | Shaw | |
| 7,434,427 B1 | 10/2008 | Miresmaili | |
| 7,469,564 B1 | 12/2008 | Shaw | |
| 7,537,117 B2 | 5/2009 | Roesler | |
| 7,845,202 B2 | 12/2010 | Padilla et al. | |
| 8,074,477 B1 | 12/2011 | Weiche | |
| 8,104,313 B2 | 1/2012 | Wolfe | |
| 8,157,181 B2 | 4/2012 | Bates et al. | |
| 8,201,426 B2 | 6/2012 | Heim et al. | |
| 8,826,704 B1 | 9/2014 | Marshall | |
| 9,218,699 B1 * | 12/2015 | McIntyre | E05G 1/00 |
| 9,428,114 B2 | 8/2016 | Mothersele | |
| 9,530,266 B2 | 12/2016 | Delattre et al. | |
| 9,534,867 B2 | 1/2017 | Dunn et al. | |
| 10,472,879 B1 * | 11/2019 | Galler | E05B 53/00 |
| 11,078,687 B2 * | 8/2021 | Mack | F41C 33/06 |
| 11,078,713 B1 * | 8/2021 | Baker | E05G 1/02 |
| 2001/0010491 A1 | 8/2001 | Marneweck et al. | |
| 2003/0001724 A1 | 1/2003 | Willats et al. | |
| 2003/0016345 A1 * | 1/2003 | Nagasaka | G06V 40/1347 356/71 |
| 2003/0141959 A1 | 7/2003 | Keogh | G07C 9/00563 340/5.53 |
| 2003/0167693 A1 | 9/2003 | Mainini | |
| 2003/0217574 A1 | 11/2003 | Meis | |
| 2005/0235711 A1 | 10/2005 | Martin et al. | |
| 2006/0009685 A1 * | 1/2006 | Finarov | A61B 5/0053 600/344 |
| 2006/0213239 A1 | 9/2006 | Roatis et al. | |
| 2006/0283219 A1 | 12/2006 | Bendz et al. | |
| 2007/0000965 A1 | 1/2007 | Cannon. Jr. | |
| 2007/0018787 A1 | 1/2007 | Martinez de Velasco Cortina et al. | |
| 2007/0058841 A1 * | 3/2007 | Miura | E05B 81/76 382/115 |
| 2007/0257772 A1 | 11/2007 | Marcelle et al. | |
| 2008/0047860 A1 | 2/2008 | Shane | |
| 2008/0180211 A1 | 7/2008 | Lien | |
| 2008/0256998 A1 | 10/2008 | Mallian et al. | |
| 2008/0264309 A1 | 10/2008 | Villiger | |
| 2009/0308116 A1 | 12/2009 | Lambrou | |
| 2010/0025446 A1 | 2/2010 | Eberle | |
| 2010/0079046 A1 * | 4/2010 | Vint | G06Q 20/40145 312/333 |
| 2010/0134193 A1 | 6/2010 | Maede | |
| 2010/0171589 A1 | 7/2010 | Haberli | |
| 2010/0194527 A1 | 8/2010 | Loughlin et al. | |
| 2010/0236298 A1 | 9/2010 | James et al. | |
| 2010/0243492 A1 | 9/2010 | Bulthius, Jr. et al. | |
| 2011/0001407 A1 * | 1/2011 | Stradiota | E05G 1/005 340/5.83 |
| 2011/0007951 A1 * | 1/2011 | Mil'shtein | G06V 40/1312 348/E7.085 |
| 2011/0162564 A1 | 7/2011 | Heim et al. | |
| 2011/0174200 A1 | 7/2011 | Bartel | |
| 2011/0175730 A1 * | 7/2011 | Stevenson | G07C 9/00912 340/5.73 |
| 2011/0247950 A1 | 10/2011 | McGee | |
| 2011/0290837 A1 | 12/2011 | Smith | |
| 2012/0152776 A1 | 6/2012 | Camp | |
| 2012/0230555 A1 * | 9/2012 | Miura | G06V 30/242 382/124 |
| 2012/0281889 A1 * | 11/2012 | Yang | E05B 65/0075 382/124 |
| 2012/0324968 A1 | 12/2012 | Goren et al. | |
| 2013/0025511 A1 * | 1/2013 | Maxwell | E05G 1/04 109/59 R |
| 2013/0055933 A1 | 3/2013 | Markman et al. | |
| 2013/0133558 A1 | 5/2013 | Andrews | |
| 2013/0298616 A1 | 11/2013 | Ullrich et al. | |
| 2014/0083338 A1 | 3/2014 | McAlexander | |
| 2014/0116303 A1 | 5/2014 | Mothersele | |
| 2014/0145819 A1 | 5/2014 | Wall et al. | |
| 2014/0182489 A1 | 7/2014 | Suggs et al. | |
| 2014/0196636 A1 * | 7/2014 | Deweese | E05G 1/00 109/23 |
| 2014/0245934 A1 * | 9/2014 | Delattre | E05G 1/04 109/38 |
| 2015/0284986 A1 * | 10/2015 | Wall | E05G 1/024 109/38 |
| 2015/0332528 A1 * | 11/2015 | McGinnis | E05B 65/0075 109/23 |
| 2016/0053526 A1 * | 2/2016 | Dittrich | E05G 1/026 109/38 |
| 2016/0123701 A1 * | 5/2016 | Ho | E05C 9/02 70/63 |
| 2018/0163456 A1 * | 6/2018 | Hyde | B65D 25/28 |
| 2018/0325427 A1 * | 11/2018 | Itoh | H01S 5/022 |
| 2018/0372447 A1 * | 12/2018 | Hyde | G08B 13/1436 |
| 2019/0014271 A1 * | 1/2019 | Itoh | H04N 5/335 |
| 2019/0340856 A1 * | 11/2019 | Gilbert | E05B 47/0012 |
| 2020/0035047 A1 * | 1/2020 | Arnold | G07C 9/00563 |
| 2020/0035052 A1 * | 1/2020 | Arnold | G07C 9/00912 |
| 2020/0966290 A1 | 3/2020 | Hui | |
| 2020/0191522 A1 | 6/2020 | Searle et al. | |
| 2020/0234555 A1 * | 7/2020 | Rambadt | E05G 1/10 |

FOREIGN PATENT DOCUMENTS

| | | |
|---|---|---|
| CN | 304751881 S | 7/2018 |
| CN | 304753854 S | 7/2018 |
| CN | 207742680 U | 8/2018 |
| CN | 305633088 S | 3/2020 |
| CN | 305892679 S | 7/2020 |

OTHER PUBLICATIONS

Anonymous, "SV500 speedvault", Internet article, https://web.archive.org/web/20120115042241/http://www.gunvault.com/sv500.html#, (retrieved Nov. 13, 2014).

\* cited by examiner

SAFE WITH BIOMETRIC LOCK MECHANISM

FIELD OF THE INVENTION

The present invention relates to a safe that can be unlocked using biometric data from a person. More specifically, the safe is particularly adapted for the storage of a firearm or other valuable and utilizes vein recognition as a key to open the safe.

BACKGROUND OF THE INVENTION

Safes for storing valuables and items that are to be secured against theft and unauthorized use are known in the art. They share two common features, means forming a storage enclosure and a lock mechanism to selectively secure the safe closed, limiting access to the interior.

With particular reference to firearms, storage has become an important issue. In particular, safer storage of firearms is desired to reduce the risk of theft and unauthorized use/access. Numerous devices are available to improve the safety of a firearm during storage. Such devices include trigger locks, cable locks, lockable containers, large lightweight safes and large, heavy, fire resistant safes. While effective, each has its advantages and disadvantages. A trigger lock, although misnamed because it does not "lock" the trigger, shields the trigger from usable access, but provides no other protection, for example, protection of the firearm from theft or movement. Lockable containers are typically small and designed for the securement of handguns. Lightweight safes can accommodate long guns, like rifles and shotguns, but can be removed from a building with their contents unless secured against movement, as by bolting to a structure. They are limited in preventing damage from long lasting fire, and cannot typically be easily transferred to a vehicle for transport with a firearm therein when safe transport is desired. Large safes have some of the advantages of the small lightweight safes, but provide increased resistance to fire damage; however, they cannot be used in a vehicle or easily moved about a building because of their weight.

Locking of such safes to limit access to their interior and their contents is provided. Such locks can be mechanical combination locks, digital combination locks, biometric locks with mechanical override locks, RFID actuated locks and the like. The use of some forms of biometric information though can be problematic. For example, if the eye is used, the eye and the sensor must be close to one another to work, which means that either the eye or the sensor needs to be moved so the eye biometric data can be read, which can cause user inconvenience and a time delay to effect unlocking. Other biometric lock systems are known, but can be difficult to use because of the ability to provide the sensor access to the chosen biometric area that is to be evaluated for a match to unlock the safe.

There is thus a need for a storage container for long guns, short guns and other valuables that can be used to improve the security of storing valuables that provides for opening with biometric data.

DESCRIPTION OF THE PRIOR ART

Safes capable of storing long guns in a manner that both secure the gun and preclude its viewing when closed are well known. Lightweight safes are designed to hold a plurality of guns, but are made out of light gauge metal out of necessity, which can allow for unauthorized opening of the door with prying tools. The heavyweight safes preclude prying a door open, basically, by the use of heavy gauge metal that, in practical terms, cannot be pried open with simple prying tools. Both of these types of safes tend to be large and non-portable, allowing their user to secure a firearm both in a home or other building and present a low risk of theft of the entire safe and contents. While large lightweight safes can be more easily moved than heavy safes, they cannot be easily stored out of sight in a vehicle. Heavyweight safes cannot be easily moved or transported out of sight in a vehicle. Both types of safes are similar in their general construction. They have a pair of side walls, a back wall and top and bottom walls. They also have a door that is hingedly mounted for movement between open and closed positions. Such safes also include a latch mechanism that releasably secures the door in its closed position. Typically, a key lock or combination lock secures the latch mechanism in its door closed configuration. Heavy safes typically include a plurality of locking bolts mounted in the door that are each movable into an opening in a frame around the safe door. Lightweight safes use a much simpler mechanism for latching the door in its closed condition, but can allow a prybar to be inserted between an edge of the door and an edge of the door frame to pry the door open, either by bending the latch mechanism and/or the frame. Adding reinforcement to the door frame on a light weight safe, because of the length of the door frame, is not always practical or effective. In addition, it adds to the weight and expense of the safe. Both types of safes, however, do provide a measure of security for the stored contents and varying levels of fire resistance.

While these safes are effective, the safes can be heavy, limiting portability, and can be time consuming to open in an emergency. In addition, a lock combination or key can be provided to unauthorized people. Picking such locks can also be accomplished.

SUMMARY OF THE INVENTION

It is an objective of the present invention to provide a safe adapted for the storage of a valuable that can be opened using biometric data obtained from an authorized user.

Accordingly, it is a primary objective of the present invention to provide such a safe that utilizes biometric data, including blood vessels in the finger.

It is a further objective of the present invention to provide such a safe with the non-electronic manual means to unlock the safe to provide access to the storage chamber therein.

It is yet another objective of the present invention to provide such a safe with a latch mechanism that allows for re-locking of the safe manually by simply closing the lid.

It is a still further objective of the invention to provide such a safe with a digital imaging system that utilizes near infrared light to create a digital image that can be stored in memory in the imaging system.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
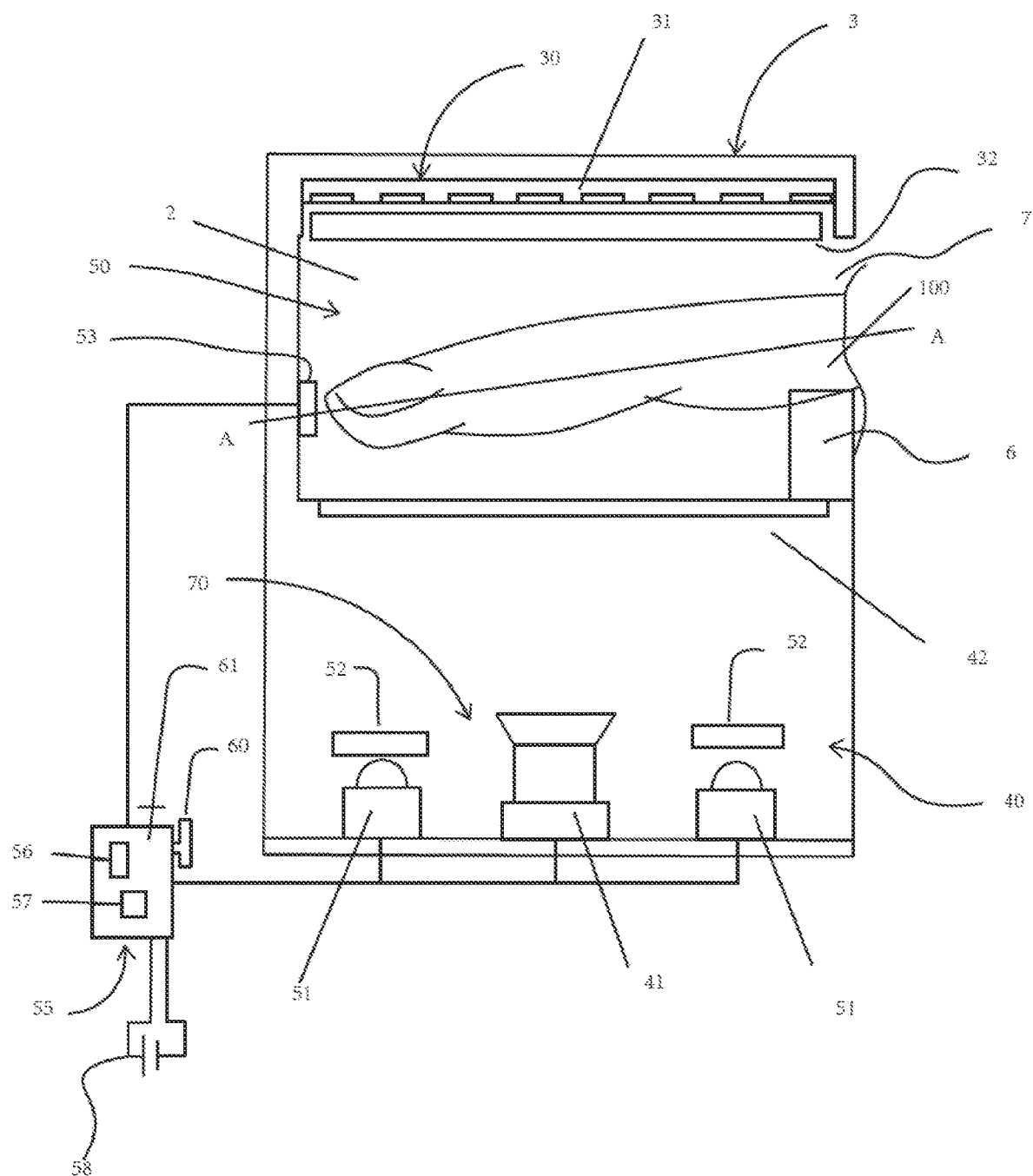
FIG. 1 is a schematic illustration of a biometric imaging system.

The present invention utilizes biometric information to effect opening of a locked safe. Finger blood vessels (veins and arteries, herein individually and collectively referred to as vessels for convenience unless otherwise noted) identification is a form of biometric identification technology. Biometric identification using blood vessels provides higher security performance than the traditional identify authentication technique of fingerprinting. Finger vessels can be imaged using near infrared light (preferably a wavelength of approximately 750 nm to about 950 nm) since a hemochrome, such as hemoglobin, absorbs or otherwise resists transmission of near infrared therethrough, while adjacent tissue allows a higher transmission of the light thereby providing image contrast with other tissue, allowing the vessels to be imaged, compared and identified.

In the identification process, due to finger thickness variation within a finger and between fingers of various people, reliable imaging can be difficult. Finger movement during imaging can also present problems. Interference with imaging caused by adjacent tissue, such as muscle and bone, can create image noise, making it difficult to image the vessels for comparison and for creating the base image for storage for future comparison.

The present invention improves image quality, and hence accuracy of comparison to authenticate the biometric image as being proper to confirm a match to effect unlocking. The below described system can include a plurality of modules, a finger positioner, a light irradiation intensifier and an image enhancement device. The finger positioner helps with controlling the finger angles of pitch and skew and rotational deviation angle of the finger. The intensifier can be irradiated by a condenser to help illuminate the finger with improved uniformity of light intensity over the view field. An image enhancement module can utilize a catoptric system to obtain improved marginal information of the finger through a longer light path for improved image contrast.

The biometric identification device for a safe 4 (FIG. 4), includes a housing 1. The housing 1 contains a finger positioning module 50 that includes a finger positioning receptacle 2, a radiation source module 30, and an imaging module 40.

FIG. 1 schematically illustrates a biometric, such as a blood vessel, identification device 3 including alternate features as discussed below. The device 3 is part of the safe 4, and includes an imaging system that is provided with a radiation source module 30, an imaging module 40, a finger positioning module 50, and a control module 55 operably associated with one another to provide biometric information for storage and matching to effect unlocking of the safe 4.

The finger positioning module 50 includes a finger receptacle 2 for the receipt of a finger 100 therein for imaging. The finger receptacle 2 can also be provided with a finger support 6 adjacent a finger entry opening 7. The device 3 is provided with a radiation source module 30 positioned for irradiating a finger 100 with near infrared light while positioned in the finger receptacle 2. A finger vessel image forming module 40 is provided to digitally image the finger 100 and its interior vessels while a finger is positioned in the receptacle 2.

The radiation source module 30 includes a light source 31 with an intensity sufficient to pass through an inserted finger 100 and be digitally recorded by a camera 41 described below. Preferably, the light source 31 includes an LED array that emits light toward the finger 100 and the camera 41 directly or via reflections as described below. The light that impinges on the finger 100 is in the near infrared spectrum, and preferably with a wavelength in the range of between about 750 nm and about 950 nm. Light in this wavelength band is absorbed and/or reflected by the blood in the blood vessels, making the vessels darker in the image than the surrounding tissue, revealing details in shape and structure, such as connections of the vessels adequate for imaging and analyzing them. The wavelength of light can be provided by the LED's light source directly and/or through the use of an optical filter configured for near infrared light transmission.

The finger positioner module 50 includes a switch 53, seen schematically in FIG. 1, which will be activated by the presence of a finger 100 in a desired position for initiating the imaging process. The switch 53 is connected to a control module 55 that can include a processor 56 programmed to provide control of the imaging and matching processes, and can include memory 57, both primary and secondary, for the processing of data and permanent storage of image data for comparison/matching. The switch 53 can be of any suitable type, such as a mechanical microswitch or a proximity switch. Preferably, the switch 53 is a mechanical switch positioned to sense or engage a desired finger portion, such as a distal end portion of a finger 100 when the finger is fully extended into the receptacle 2. The switch 53 can also be mounted adjacent to the finger support 6. The control module 55 is suitably powered, as with a battery and/or line plug in energy source 58. One or more location fixing devices or finger support 6 can be provided in the receptacle 2 to help position and limit movement of the finger 100 in an acceptable orientation of skew, pitch and rotational angular positions. The control module 55 can be provided with a reset function that will allow for the deletion of one or more stored vessel images in order to revoke access to a person and prevent them from opening the safe 4.

The finger vessel imaging module 40 includes at least one, and as shown a plurality of lights 51 that produce light in the visible spectrum, and that are operable to have light therefrom pass through the filter 42 to illuminate the finger 100, making it visible to the camera 41. The imaging module 40 also includes the filter 42 positioned in the infrared light path between the receptacle 2 and the camera 41 and lights 51. The filter 42 is a photo filter and is operable to filter out near infrared light that has irradiated a finger 100, but is operable to allow imaging of the irradiated vessels in the finger 100 by the camera 41. The camera 41 is part of the imaging module 40. The camera 41 can be any suitable digital camera, as for example a CMOS camera. The camera 41 is operable to provide image data to the image module 55 for processing, and possible long term storage to effect future matching and safe unlocking. An imaging function initiator operator, such as a switch with an operator button 60, is pressed to start operation of the control module 55, the image module 40 and the radiation source module 30. It is to be understood that the switch 53 could serve this function. The switch 60 is connected to the control module 55, which is operable to control camera operation and receive image data from the camera 41. The switch 60 could also be used to select whether the control module 55 is to be used to scan a finger to input a vessel image for storage and later comparison, or for scanning to determine a match. A selected mode of operation can be indicated by lights, not shown. Further, for inputting a scan for future image matching, a switch with activator 61, such as an actuator button inside the safe, can be provided and access achieved by using a keylock, described below, to open the safe 4 and provide access to the activator 61 to effect learning of a person's vessel system for image matching.

A reflective light source 70 is provided and is operable to provide light to illuminate the surface of an inserted finger 100, allowing the camera 41 to better record the finger 100. This lighting provides an image of the finger exterior, followed later with the vessel image provided by the infrared light system described above. Light from the reflective light source 70 is in the visible spectrum. The reflective light source 70 directs light toward the finger 100 and preferably includes one or more lights 51. As shown, a plurality of lights 51 is provided, with one being directed principally toward the tip portion of finger receptacle 2, and the other light 51 being principally directed toward the finger distal end portion of the receptacle 2. The infrared filter 42 is positioned between the described camera 41 and the receptacle 2.

In use, a finger 100 is inserted into the receptacle 2 and actuates the switch 53, which in turn powers the lights 51, which illuminate the finger 100 to determine its position, skew, pitch and rotation, and the camera 41 is on feeding image data to the control module 55, which will adjust for the finger position through its programming. The lights 51 are then turned off, and the radiation source light 31 is turned on. The radiation source light 31 then provides a vessel image for the camera 41 to start the scanning/matching process. The control module 55 processes the image data from the infrared exposure for feature extraction, and determines if pre-set threshold values are met to determine if there is a match when the system is in matching mode. The control module 55 can then adjust for the position skew, pitch and rotational angles if needed and determine if there is a match to a stored image; and if there is a match, actuate a locking mechanism described below to unlock the safe 4.

In the comparison to determine match/no match, the control module 55, through its programming, carries out a multimode identification of the images after position normalization conversion. The image analysis and comparison flow includes first carrying out finger elevation information, finger mean breadth and each regional luminance information; second, effecting noise reduction of the vessel image and carrying out spatial adjustment of the vessel image; third, normalizing the vessel image and adjusting for size difference; fourth, carrying out FFT (fast Fourier transformation) of the vessel image and obtaining characteristic values; and fifth, determining if there is a match or no match. If there is a match, the latching mechanism 121 is then actuated to unlock the safe 4.

As shown, the above described device 3 can also be provided with a lens 52 associated with at least one of the light sources 51. The light from the associated light source 51 is irradiated through the respective lens 52 into the receptacle 2 and onto a finger 100. The lens 52 is operable to alter the light pattern impinging on a portion of the finger 100.

The above described device 3 can also be provided with a condenser 32 associated with the infrared light array 31. The condenser 32 is positioned between the infrared light source 31 and the finger 100. The condenser 32 concentrates the infrared light to better illuminate the finger 100 and the vessels therein. A rod type condenser can be used.

Figure 2:
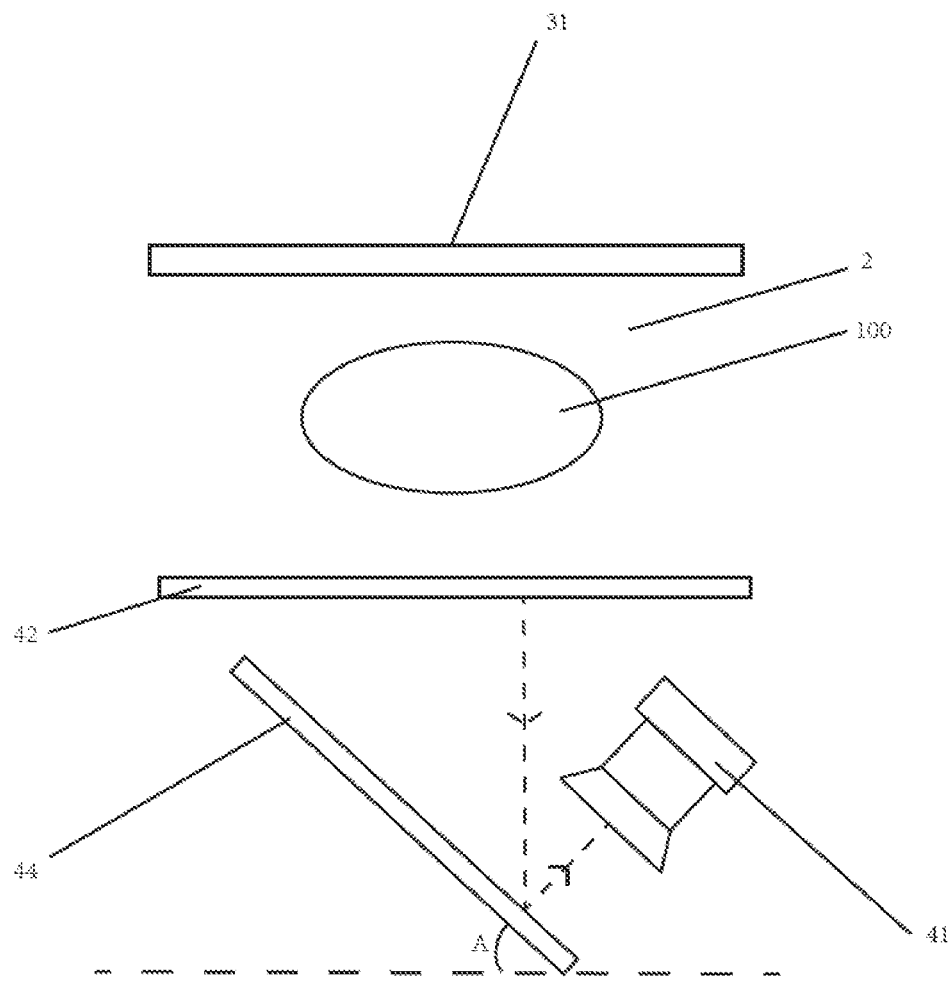
FIG. 2 is a schematic illustration of a modification of the biometric imaging system of FIG. 1.
Figure 3:
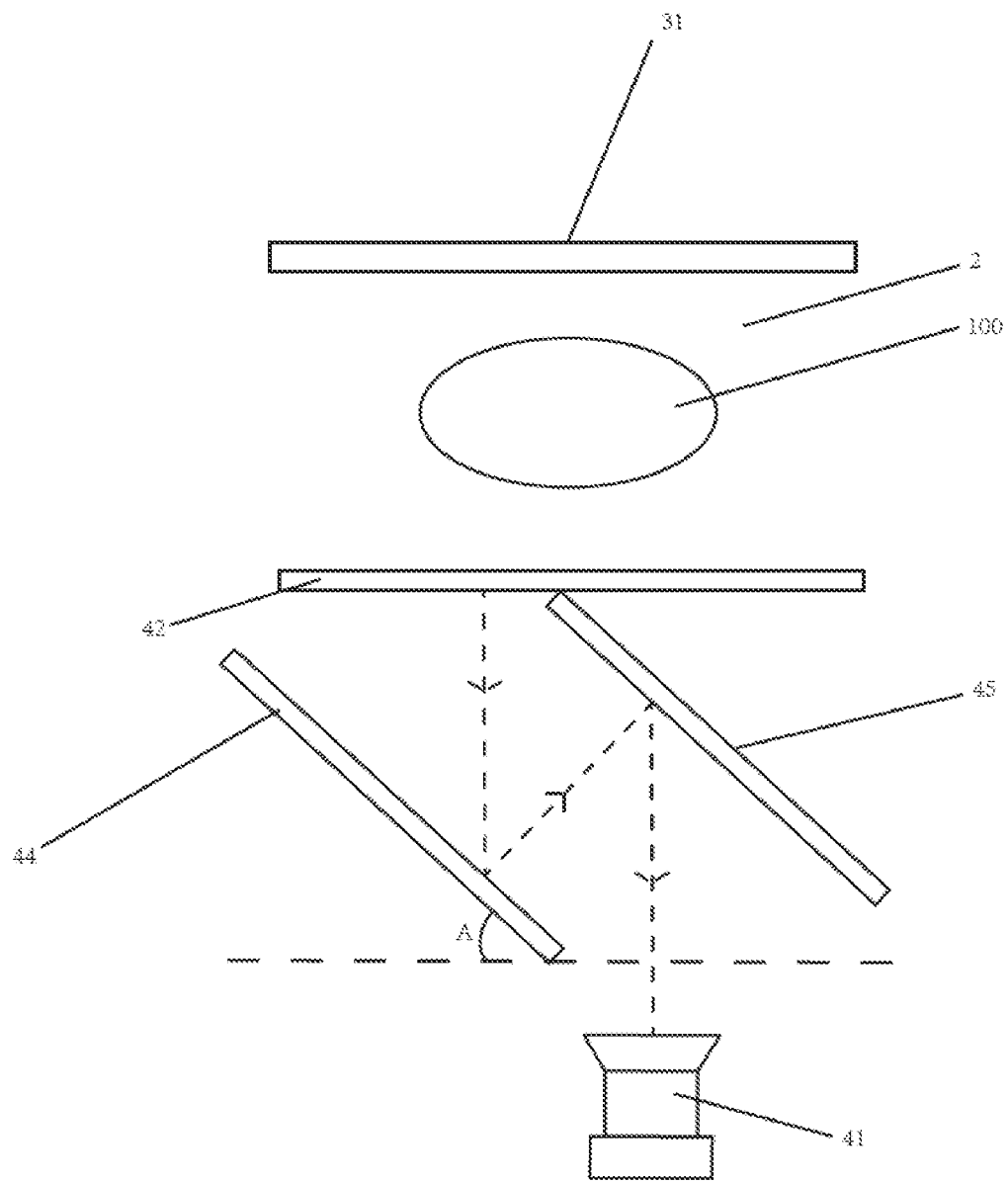
FIG. 3 is a schematic illustration of a second modification of the biometric imaging system of FIG. 1.

As shown in FIGS. 2, 3, the device 3 can be provided with a reflective mirror system to increase the optical path length from the camera 41 to the finger 100. The mirror system can include one or more mirrors, including a primary mirror 44, which is positioned closest in the optical path to the finger 100. A second mirror 45 can also be provided to redirect the optical path from the primary mirror 44. In a single mirror system, the angle A relative to the longitudinal axis A-A of the finger 100 is preferably approximately 45°. The camera 41 is positioned to the side a distance from the mirror with the central axis of the camera lens being at an angle of about 45° from the plane of mirror 44, and generally parallel to the axis A-A. This increased optical path length can allow for a lens of a different focal length than that used when the camera 41 is constrained to be close to the finger 100. A plurality of mirrors can be used, as seen in FIG. 3. This allows for a different mounting position for the camera 41 than shown in FIG. 2. In this embodiment, a pair of mirrors is used, primary mirror 44 and secondary mirror 45. The mirrors 44, 45 are positioned such that the planes of the mirrors are generally parallel. The mirrors 44, 45 extend in a direction along the length of the receptacle 2 and finger positioner module 50, and the finger 100 therein. The angle A in this embodiment can be about 37° with the planes of the mirrors being generally parallel.

The light source 31 provides near infrared light, preferably with wavelength between about 750 mm and about 950 mm. The filter 42 can be a Shi Caiyong narrow bandpass filter. If the light source 31 provides multispectral light, a long wave pass filter can be used.

Figure 4:
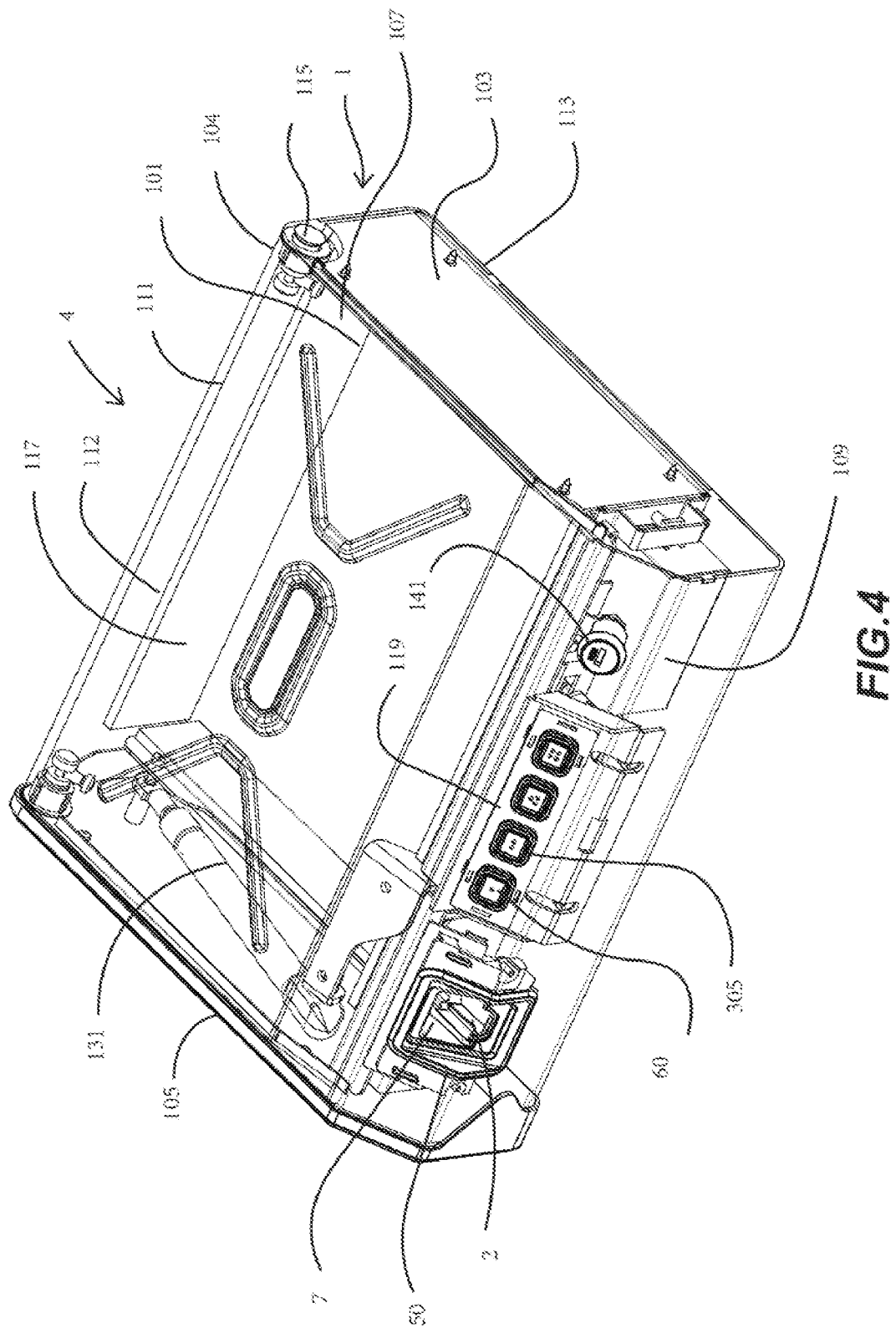
FIG. 4 is an isometric view of a safe utilizing the biometric imaging system.
Figure 5:
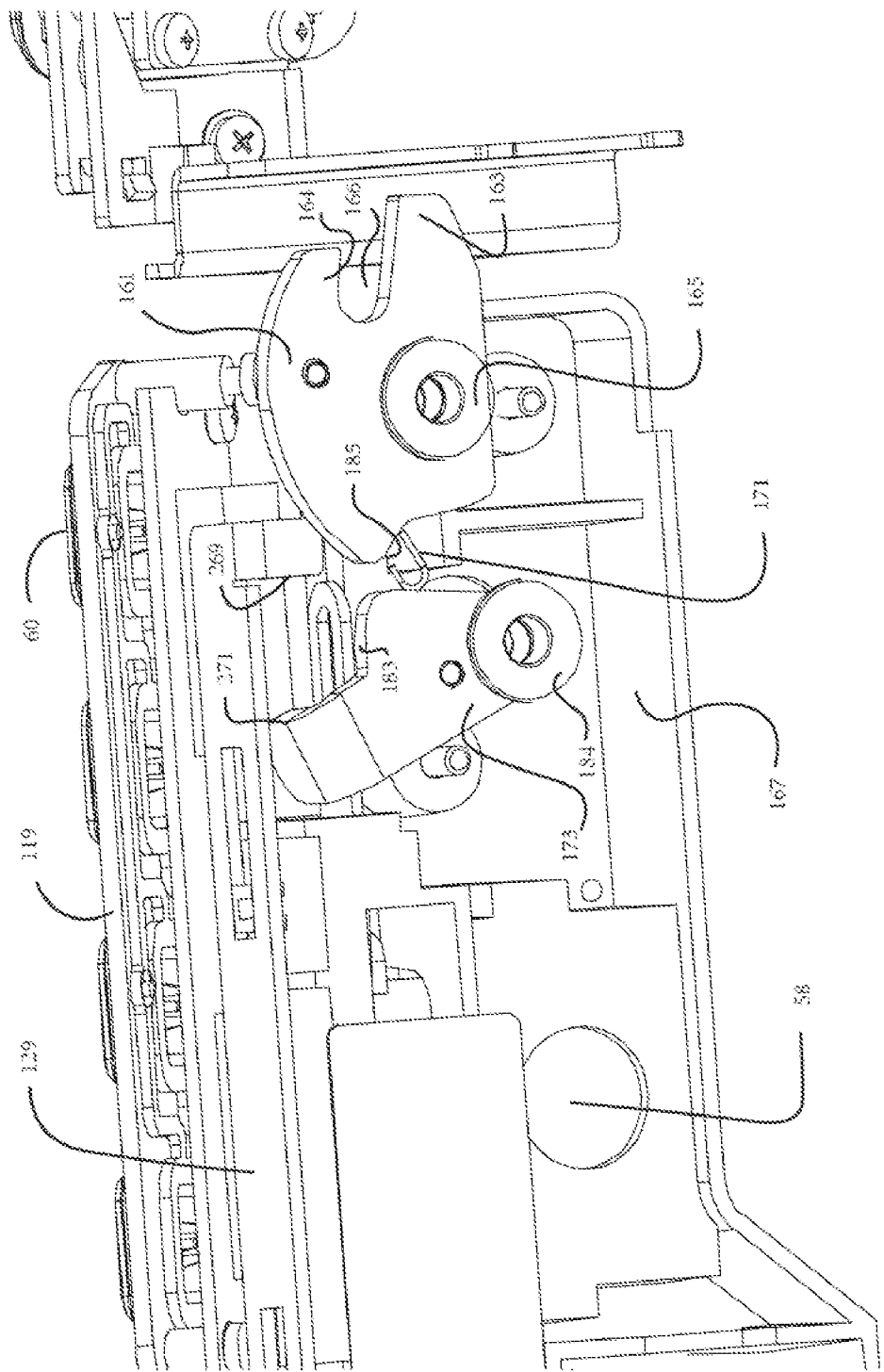
FIG. 5 is a fragmentary side isometric view of portions of the latching mechanism with the lock device shown in a position to achieve unlatching.
Figure 6:
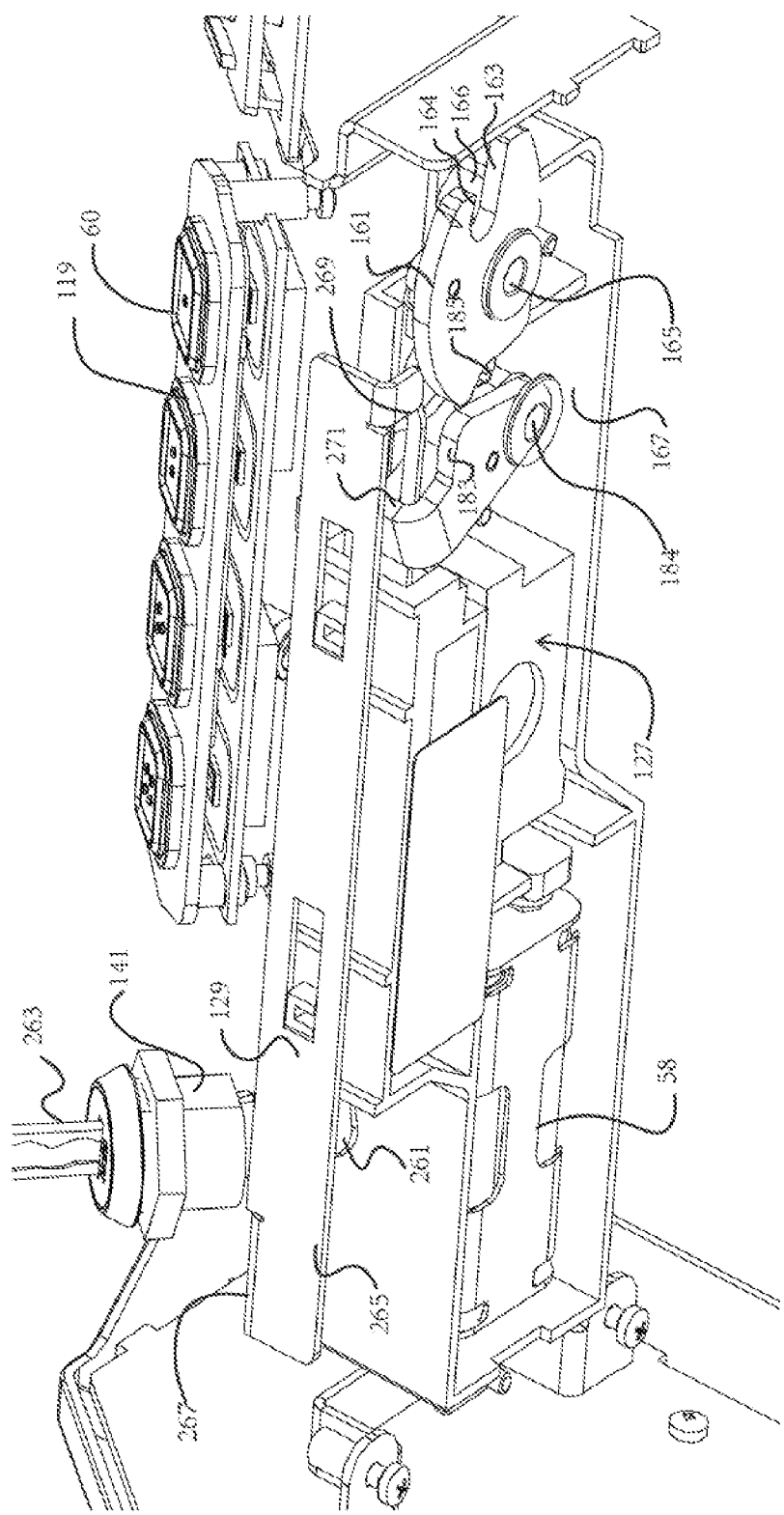
FIG. 6 is a fragmentary side isometric view of portions of the latching mechanism including a manual unlocking system, with the lock device shown in a position to achieve unlatching.
Figure 7:
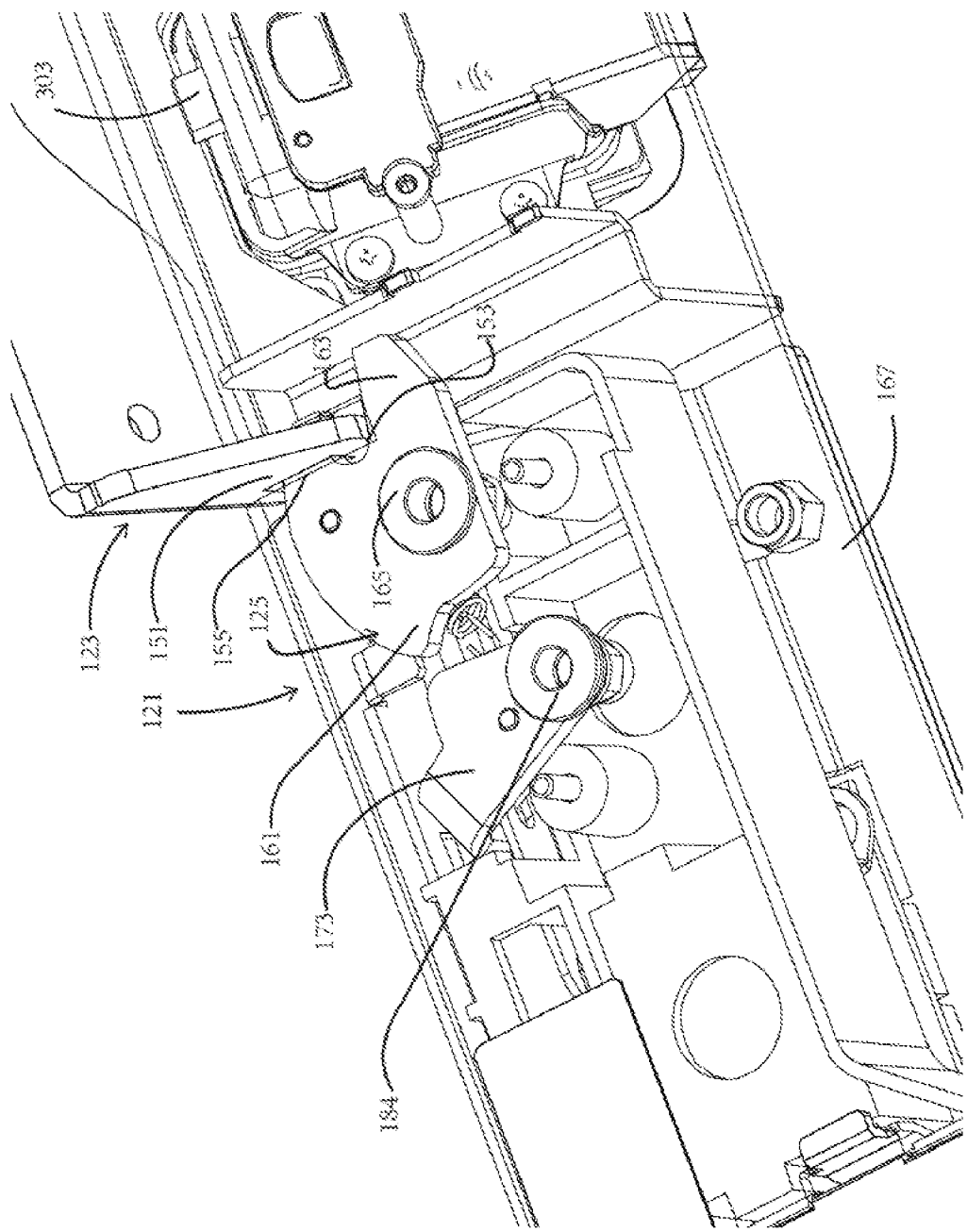
FIG. 7 is a fragmentary side elevation view of the latching mechanism shown with the retainer in a latching position and the lock device shown in a position to achieve unlatching.
Figure 8:
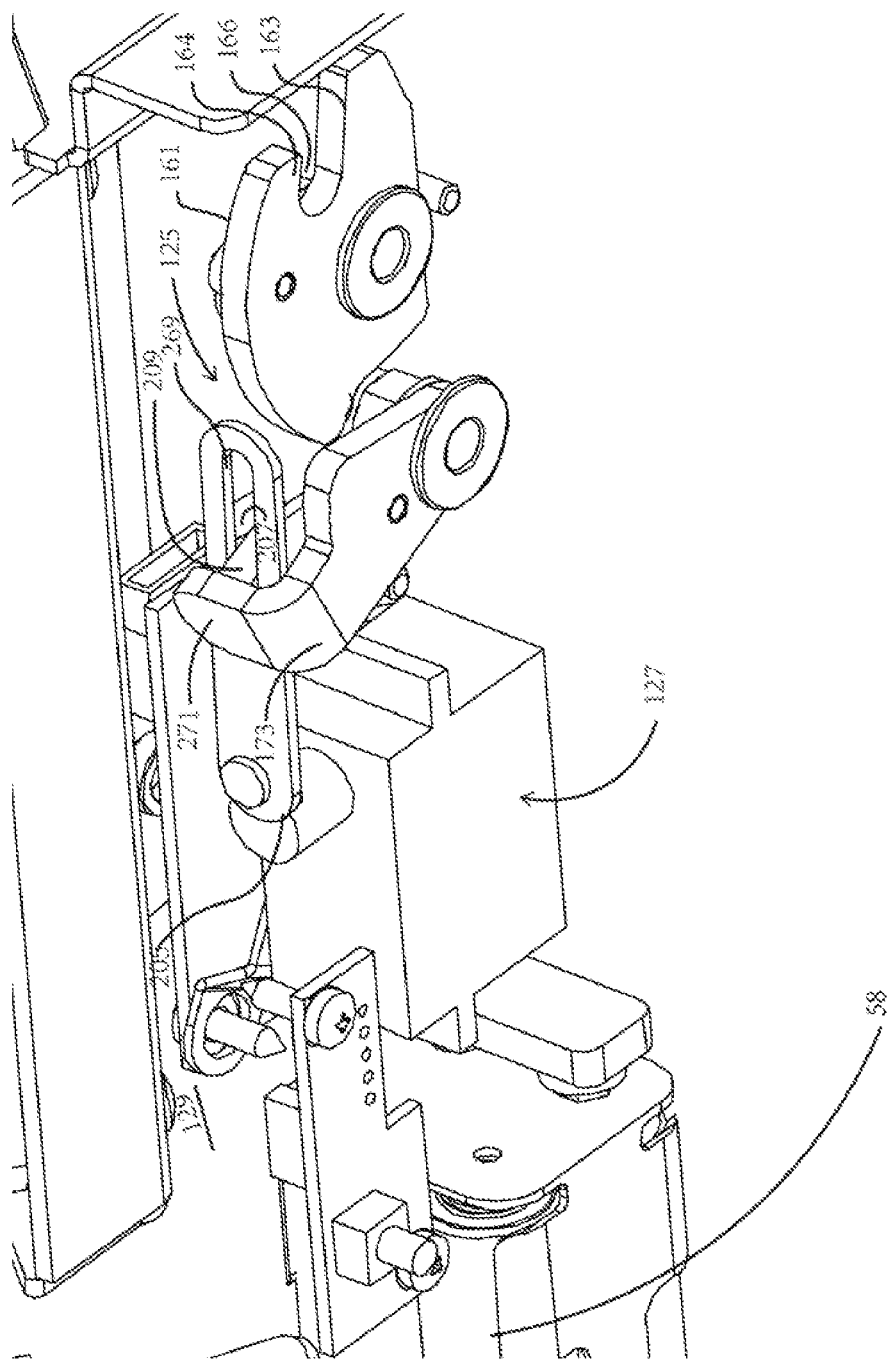
FIG. 8 is a fragmentary side isometric view of the latching mechanism shown with the retainer in a latching position in the lock device shown in a position to achieve unlatching.
Figure 9:
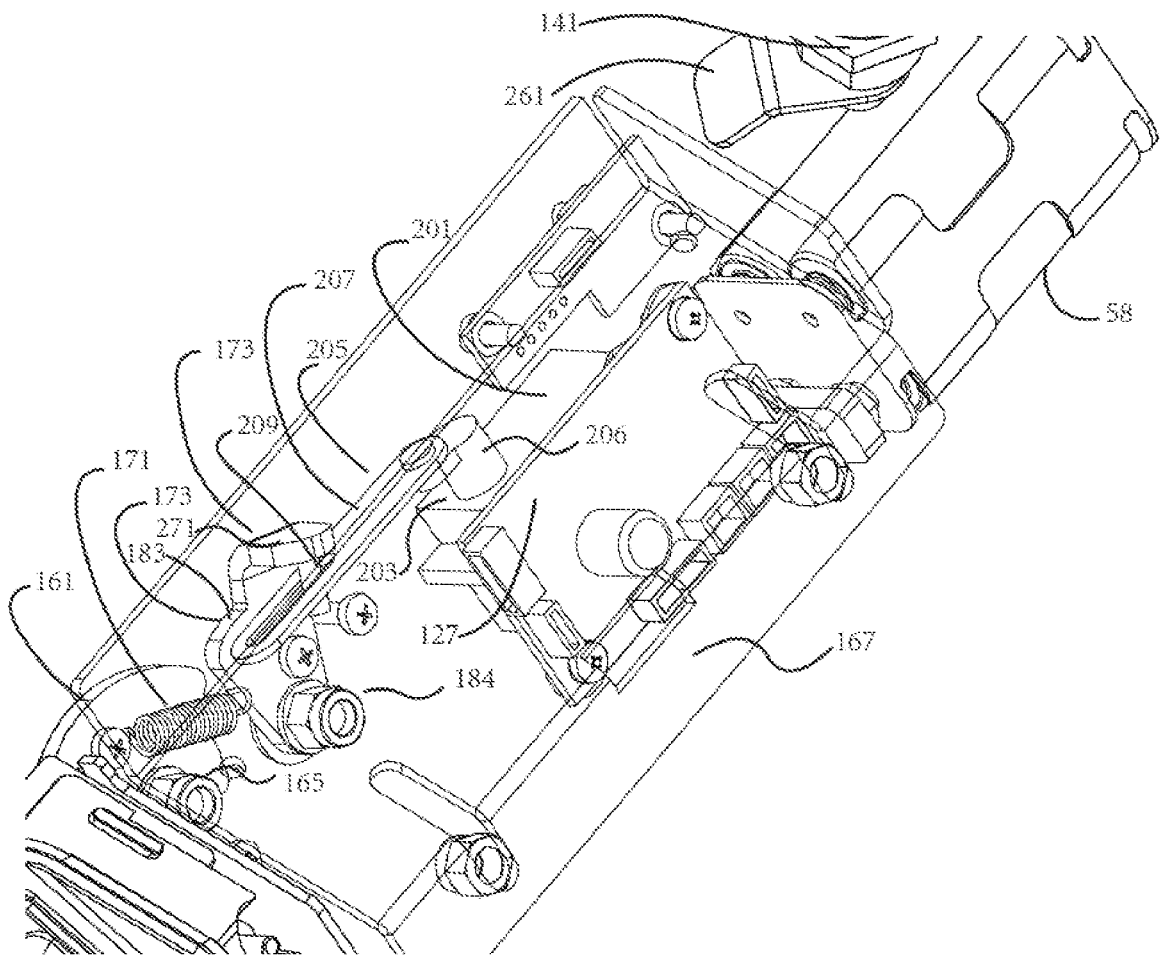
FIG. 9 is a fragmentary side isometric view of the latching mechanism shown from the reverse side of the latching mechanism, as seen in FIGS. 4-8.

FIGS. 4-9 show details of the safe 4. The safe 4 includes a housing 104 comprised of two halves (half as used herein does not mean of equal size but one of two portions), which are illustrated as an upper half lid 101 and the lower half base 103. As used herein, positional and orientation terms are used in the sense as if the safe 4 were setting on a table or the like with the controls facing upwardly. It is to be understood that the safe 4 can be stored in numerous positions, for example, while being mounted in a vehicle. The safe 4 includes end walls 105, 107, a front wall 109, a back wall 111 and top and bottom walls 112, 113 respectively. In the illustrated structure, the lid 101 and base 103 include portions of the end walls 105, 107 and portions of the front wall 109 and back wall 111. While not shown, portions of the end walls 105, 107 on one half, for example the base 103, can fit inside portions of the upper half portions of the end walls 105, 107 to resist penetration of the safe with prying tools. The upper and lower portions of the back wall 111 are hingedly connected together as with a hinge 115, preferably extending along substantially the entire length of the back wall 111 to also help prevent the insertion of a prying tool between the adjacent edges thereof. The lid 101 and base 103 define a storage chamber 117 that is shaped and configured to hold a valuable, such as a firearm, as well as components of a latch mechanism and operational control devices described below. As seen in FIG. 4, a control panel 119 is exposed on the front wall portion 109 of the base 103. Preferably, the safe 4 is made of a metallic material such as steel. As used herein, the switches can be any suitable device used to enable or disable a function, and can be a mechanical switch with actuator, a touch pad, a touch screen, voice activation or the like.

The safe 4 is provided with a latching mechanism 121 that includes a cooperating latch and catch devices 123, 125 respectively. The latching mechanism 121 also includes an electrically operated release mechanism 127 and a mechanical release mechanism 129 that are operable to effect release of the latch device 123 from the catch device 125, allowing the safe 4 to be opened. In a preferred embodiment, the latching mechanism 121 is operable to effect latched closure of the lid 101 and base 103 by movement of the front wall portions 109 together from an open position to a closed position about the hinge 115. The safe 4 can also be optionally provided with a lift device 131, such as an air spring that has one end mounted to the lid 101 and the other end mounted to the base 103. The lift device 131 is operable to effect movement of the lid 101 relative to the base 103 about the hinge 115.

The latching mechanism 121 is operably coupled to the control module 55 to effect its unlatching when a vessel scan of a finger 100 demonstrates a match to a stored vessel scan image. The safe 4 can also be opened manually, as with a key lock/cylinder 141 described below.

In the illustrated structure, the latch device 123 is secured to the lid 101 in any suitable manner. As shown, the latch device 123 includes a pair of spaced apart legs 151 connected together by a bight 153 to form a generally U-shaped opening 155 for receipt of a portion of the catch 125 therein. The latch 123 can be made of any suitable material, such as a metallic material like steel.

The catch device 125 includes a combination hook forming retainer member 161 with a striker portion 163 and a catch portion 164 forming a latch receiving throat 166. The retainer 161 is pivotally mounted on a pivot pin 165 that is in turn mounted on a support frame 167. The catch device 125 is biased to an unlatched position. Biasing can be accomplished by the use of a resiliently deformable member 171, such as a spring. As shown, one end of the spring 171 is connected to the retainer 161, while another end of the spring 171 is connected to a lock device 173. The spring 171 is under tension, which tension is decreased by pivoting movement of the retainer 161 to its unlatching position. As shown, the lock device 173 is pivotally mounted via a pivot pin 184 that is in turn mounted on the support frame 167. The spring 171 biases rotation of the lock device 173 in one direction and rotation of the retainer 161 in the opposite direction whereby a first lock surface 183 of the lock device 173 will engage a second lock surface 185 of the retainer 161, selectively preventing relative rotation between the retainer 161 and lock device 173 when the retainer 161 is in its latching position with the latch 123. Tension from the spring 171 will retain the retainer 161 and lock device 173 against relative rotation during latching. As shown, the retainer 161 and lock device 173 are shown in positions at the beginning of an unlocking action with the retainer yet to start pivoting.

The catch device 125 includes means for selectively moving the retainer 161 to its unlocked configuration, allowing the latch 123 and the lid 101 to move to an open position. In a preferred embodiment, the catch device 125 includes an electrically powered operator device 127 operably coupled to the retainer 161. As shown, the operator 127 is coupled to the lock device 173, which in turn is coupled to the retainer 161 through the spring 171; whereby unlatching rotation of the lock device 173 moves the locking surfaces 183, 185 out of engagement with one another and tension applied by the spring 171 effects unlatching rotation of the retainer 161 to move it out of engagement with the latch 123, allowing the lid 101 to move to its open position. To close and lock the lid 101, a person applies force to the lid 101 to move it about its hinge 115 and to effect retraction of the lift device 131. The latch 123 moves into engagement with the striker 163 and effects pivoting movement of the retainer 161 until the spring 171 is able to pivotally move the lock device 173 to a position where the locking surfaces 183, 185 engage one another to prevent relative rotation between the retainer 161 and latch 123 until unlocking is effected by the operator 127 or key 141.

The operator 127 is operable when powered to selectively effect rotation of the retainer 161 to move the surfaces 183, 185 out of engagement with one another, thereby allowing the retainer 161 to move out of engagement with the latch 123. In a preferred embodiment, the operator 127 includes an electric motor 201 that is coupled to a drive unit 203, such as a right angle gear drive. A lost motion link 205 is operably connected to an output shaft 206 of the drive unit 203. The link 205 has an elongate slot 207 in which is received a follower pin 209 which is secured to the lock device 173. When the surface defining the end of the slot 207 engages the pin 209, due to rotation of the motor 201 and the drive unit 203 output shaft 206, rotation of the lock device 173 is effected, which in turn effects rotation of the retainer 161 to unlatch the lid 101, allowing it to open. Upon completing the opening effecting motion of the link 205, the motor 201 returns to its initial start position to be ready to effect a subsequent unlatching. This return can be effected by a load sensing device which indicates that the lost motion link 205 has moved to its rearmost unlatching position and instructs the motor to move the link 205 back to its start position. Such reversal can also be accomplished by the use of an encoder motor that determines how far the motor 201 has rotated or drive unit 203 has rotated, and that unlatching has been effected and that the motor is to return the link 205 back to its start position. Switches could also be used to effect the reversal of link 205 movement. When the safe 4 is to be closed and latched (locked), the latch 123 effects movement of the retainer 161 to its latching position and this movement effects rotation of the lock 173 under tension from the spring 171 and movement of pin 209 along the slot 207, thereby allowing the motor 201 and the drive 203 to remain motionless during latching.

The control module 55 and motor 201 are suitably powered by electricity from a source 58 which can include batteries, non-rechargeable or rechargeable, and/or AC from a household circuit or the like.

A mechanical release mechanism 129 is preferably provided and is operable to effect manual opening of the safe 4, bypassing the electrical opening function. See FIGS. 5, 6. As shown, a key lock 141 is mounted to the safe 4, preferably to the base 103. The lock 141 can be a cylinder lock, barrel lock, dimple key lock or any other suitable mechanical lock type. The lock 141 is provided with an arm 261 that will move when the lock 141 is operated with its key 263. The arm 261 is operable to engage an abutment 267 of a transfer link 265. The link 265 is movably mounted in the housing 104, as on the frame 167, and has a second abutment 269 configured and positioned to engage a surface 271 of the lock device 181, and operable to effect rotation thereof upon actuation of the lock 141. This rotation will cause a disengagement of the surfaces 183, 185, allowing the retainer 161 to rotate under the influence of the spring 171 to effect unlocking of the catch device 125 and releasing of the lid 101 of the housing 104, thereby allowing access to the chamber 117 of the safe 4. The lock 141 can be spring-loaded to effect return of the link 265 to its normal position, and the lid 101 can then be re-closed and latched as described above.

The safe 4 is operated as follows for initial set up. A person who is to be an authorized user activates the control module 55 by powering it up using a power on switch 60 on the control panel 119. The safe 4 is opened manually, providing access to a switch 303 which is located in the chamber 117. A finger 100 is inserted into the receptacle 7 and the—switch 303 is activated, starting the scanning process. First, the angular position of the finger 100 is determined by the control module 55 programming and the light(s) 51 is then turned off. The control module 55 will provide an indication to the user if the scan was successful. If so, if desired, the operator can then activate a switch 305 indicating that the scan is to be put into permanent storage in the control module 55. After the scan, the safe 4 can be closed and latched as described above. The safe 4 can then be opened manually as described above, or an authorized finger can be inserted into the receptacle 7 for scanning to determine if it matches an image stored in the memory 57 of the control module 55. If there is a match, then the motor 201 is actuated to effect releasing of the latch 123 from the retainer 161, allowing the safe 4 to open under the influence of the lift device 131. The contents in the safe 4 can then be removed, or contents can be added to the safe 4. After that, the safe 4 can be configured in its closed and locked the configuration.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A safe for storing items such as a firearm, the safe comprising:
   a housing defining a storage chamber, the housing including a first portion and a second portion hingedly connected together with said first and second portions being selectively movable relative to one another;
   a latch mechanism associated with the housing and operable to selectively, releasably secure the first and second portions in a closed configuration, the latch mechanism including a latch device mounted to one of said first and second portions and including a catch device mounted to the other of said first and second portions, wherein the catch device includes a retainer pivotally mounted in the housing, said catch device including a striker portioned for selective contact with the latch device to selectively effect rotation of the retainer, said latch mechanism including a resiliently deformable member coupled to the retainer and operable to bias said retainer to an unlatching position when the latching mechanism is in an unlatched position, said latch mechanism also including a mechanical lock device operably associated with the catch and accessible from an exterior of the housing and operable to effect the release of securement of the first and second portions from the closed configuration, said latch mechanism also including an electrically powered control module operable to effect the release of securement of the first and second portions from the closed configuration, the control module comprising;
   a power source operably connected to the control module; and
   a biometric scanning device operable to scan a portion of a user and determine if collected biometric data from a scan matches stored biometric data, said scanning device including a radiation source module, an imaging module, and the control module operably associated with one another, said scanning device being operable to effect unlatching of the latch mechanism if there is a biometric match, said control module being operable to selectively effect moving the latching mechanism to the unlatched position.

2. The safe of claim 1 wherein said electrically operated control module is operably coupled to the retainer and is operable to selectively effect pivoting movement from a latching position to an unlatching position upon receiving a signal from the control module.

3. The safe of claim 2 wherein the latching mechanism further includes a lost motion mechanism at least partially coupling the electrically operated control module to the retainer.

4. The safe of claim 3 wherein the latching mechanism further includes a lock device pivotally mounted to the housing and coupled to the lost motion mechanism, said retainer having a first lock surface and said lock device having a second lock surface selectively engageable with the first lock surface to selectively prevent pivoting of the retainer when in a locking pivotal position, said resiliently deformable member being coupled between the retainer and the lock device to bias their respective pivotal movements during latching and unlatching of the lock mechanism.

5. The safe of claim 4 wherein the mechanical lock device further includes a key lock mounted to the housing and being operably associated with the lock device with a transfer link movably mounted in the housing.

6. The safe of claim 3 wherein the electrically operated unlatching mechanism further includes a motor operably connected to a gear drive.

7. The safe of claim 1 further including a finger positioning module mounted to a portion of said housing and operable to receive a finger therein for exposure to the radiation source module and the imaging module.

8. The safe of claim 7 wherein the radiation source module further includes a first light operable with a source of near infrared light configured to illuminate a finger in the finger positioning module.

9. The safe of claim 8 wherein the imaging module further includes a camera positioned for imaging a finger in the finger positioning module.

10. The safe of claim 9 wherein the imaging module further includes a second light operable to provide light in the visible spectrum on a finger in the finger positioning module.

11. The safe of claim 10 wherein the imaging module further includes an optical filter positioned between the second light and a finger in the finger positioning module and operable for filtering out near infrared light before reaching the camera.

12. The safe of claim 10 further including at least one mirror positioned in an optical path between the finger positioning module and the camera to redirect the light from a first portion of the optical path to a second portion of the optical path.

13. The safe of claim 10 including a switch positioned in the finger positioning module and connected to the control module, operable to at least partially actuate operation of the control module.

14. The safe of claim 7 wherein the control module is operable to effect operation of a second light in the imaging module to effect imaging of a finger in the finger positioning module and determine finger position and then activate a first light in the radiation source module to provide light in the near infrared spectrum to image vessels in a finger in the finger imaging module and determine if the image matches an image stored in the control module.

\* \* \* \* \*